(12) United States Patent
West et al.

(10) Patent No.: US 10,887,256 B2
(45) Date of Patent: *Jan. 5, 2021

(54) SYSTEMS AND METHODS FOR MANAGING ELECTRONIC COMMUNICATIONS

(71) Applicant: Oath Inc., Dulles, VA (US)

(72) Inventors: Robert West, Chantilly, VA (US); Charles G. Woods, Richmond, VA (US); Andrew B. Warner, Cape Coral, FL (US); Donald Le, Herndon, VA (US)

(73) Assignee: Verizon Media Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/805,170

(22) Filed: Feb. 28, 2020

(65) Prior Publication Data

US 2020/0204507 A1   Jun. 25, 2020

Related U.S. Application Data

(63) Continuation of application No. 16/152,123, filed on Oct. 4, 2018, now Pat. No. 10,630,616, which is a
(Continued)

(51) Int. Cl.
*H04L 12/58* (2006.01)
*G06Q 10/10* (2012.01)

(52) U.S. Cl.
CPC .......... *H04L 51/04* (2013.01); *G06Q 10/10* (2013.01); *G06Q 10/107* (2013.01)

(58) Field of Classification Search
CPC ....... G06Q 10/10; G06Q 10/107; H04L 51/04
See application file for complete search history.

(56) References Cited

U.S. PATENT DOCUMENTS

| 5,742,668 A * | 4/1998 | Pepe ................. H04L 29/06027 455/415 |
| 6,212,550 B1 * | 4/2001 | Segur ................. H04M 3/5307 379/88.14 |

(Continued)

OTHER PUBLICATIONS

Chou et al., "WIP: Web Service Initiation Protocol for Multimedia and Voice Communication over IP", 2006, IEEE Conference on Web Services (ICWS'06).
(Continued)

*Primary Examiner* — Todd L Barker
(74) *Attorney, Agent, or Firm* — Bookoff McAndrews, PLLC

(57) ABSTRACT

Systems and methods are disclosed for managing electronic communications. According to certain embodiments, an enterprise directory is provided for listing a plurality of enterprises. In one embodiment, the enterprise directory may include an enterprise profile for each enterprise identifying, among other things, a mode of communication for the enterprise. Enterprises that wish to communicate with one another may form partnerships with one another. In one embodiment, a partnership may be formed between two enterprises when one enterprise accepts a partnership request submitted by the other enterprise. Information regarding partnerships between enterprises may be stored in a database. Further, an enterprise user may request to electronically communicate (e.g., via IM, voice, or email) with a user associated with a different enterprise. Users associated with different enterprises may be allowed to communicate electronically with one another if their respective enterprises are in a partnership with one another.

17 Claims, 4 Drawing Sheets

Related U.S. Application Data continuation of application No. 13/959,454, filed on Aug. 5, 2013, now Pat. No. 10,122,656.

(56) References Cited

U.S. PATENT DOCUMENTS

| | | | |
|---|---|---|---|
| 6,957,199 B1 | 10/2005 | Fisher | |
| 6,996,716 B1 | 2/2006 | Hsu | |
| 7,216,093 B1 | 5/2007 | Gupta | |
| 7,313,227 B2* | 12/2007 | Jones | H04M 3/02 379/207.15 |
| 7,415,500 B2* | 8/2008 | Morris | H04L 12/1818 709/204 |
| 7,626,991 B2* | 12/2009 | Dollar | H04L 51/066 370/401 |
| 7,673,001 B1 | 3/2010 | Battle | |
| 7,706,401 B2 | 4/2010 | Bae | |
| 8,214,501 B1 | 7/2012 | Peterson | |
| 8,566,911 B2* | 10/2013 | Tu | G06F 21/42 726/4 |
| 8,694,658 B2* | 4/2014 | Gao | H04L 63/20 709/229 |
| 9,130,921 B2 | 9/2015 | Boubez | |
| 9,288,264 B2 | 3/2016 | McClain | |
| 2003/0087632 A1* | 5/2003 | Sagi | H04M 3/42382 455/414.4 |
| 2004/0128541 A1 | 7/2004 | Blakley | |
| 2005/0066263 A1 | 3/2005 | Baugher | |
| 2006/0041684 A1 | 2/2006 | Daniell | |
| 2006/0045124 A1* | 3/2006 | Dahlstrom | H04L 63/0245 370/465 |
| 2006/0092919 A1 | 5/2006 | Hallmark et al. | |
| 2006/0168022 A1 | 7/2006 | Levin et al. | |
| 2006/0168266 A1 | 7/2006 | Phillips et al. | |
| 2007/0033252 A1 | 2/2007 | Combest | |
| 2008/0132259 A1* | 6/2008 | Vin | H04L 51/066 455/466 |
| 2008/0133729 A1 | 6/2008 | Fridman | |
| 2008/0240384 A1* | 10/2008 | Suryanarayana | H04L 67/24 379/88.21 |
| 2009/0132726 A1 | 5/2009 | Daniell | |
| 2010/0082557 A1 | 4/2010 | Gao | |
| 2010/0153726 A1 | 6/2010 | Liu | |
| 2010/0169134 A1 | 7/2010 | Cheng | |
| 2010/0227688 A1 | 9/2010 | Lee | |
| 2010/0229107 A1* | 9/2010 | Turner | H04L 67/2823 715/757 |
| 2010/0312713 A1* | 12/2010 | Keltner | G06Q 50/01 705/317 |
| 2010/0319063 A1 | 12/2010 | Koppolu | |
| 2011/0261701 A1 | 10/2011 | Coates | |
| 2012/0066388 A1 | 3/2012 | Margo | |
| 2012/0131107 A1 | 5/2012 | Yost | |
| 2012/0225652 A1* | 9/2012 | Martinez | H04L 67/24 455/435.1 |
| 2013/0191464 A1 | 7/2013 | Burckart | |
| 2018/0152841 A1 | 5/2018 | Shah | |

OTHER PUBLICATIONS

Fritsch, "Next Generation In-game Message Interfaces", 2007 4th International Forum on Applied Wearable Computing (IFWAC), Mar. 2007.

Zhai, "Enhanced IM for Enhanced Presence", 2008, School of Computer Science, University of St. Andrews, 5 pages total.

Zhai, "Enhanced IM for Enhanced Presence", The 9th Annual Postgraduate Symposium on the convergence of Telecommunications, Networking and Broadcasting (PGNET 2008).

Bellavista et al., "Application and Support Technologies for Mobility and Enterprise Services", Jun. 2009, IEEE Wireless Communications, pp. 16-23.

Broman, "IMS Platform Prototype", Lulea University of Technology, Oct. 2011.

Cisco, Interdomain Federation for IM and Presence Service on Cisco Unified Communications Manager, Release 9.0(1 ), Jul. 18, 2012.

Davies et al., "Evaluating two Approaches for browser-based real-time multimedia communication", Dec. 2012, MoMM 2012 Proceedings of the 10th International Conference on Advances in Mobile Computing.

* cited by examiner

SYSTEMS AND METHODS FOR MANAGING ELECTRONIC COMMUNICATIONS

CROSS-REFERENCE TO RELATED APPLICATIONS

This application is a continuation of and claims the benefit of priority to pending U.S. application Ser. No. 16/152,123, filed on Oct. 4, 2018, which is a continuation of and claims the benefit of priority to U.S. application Ser. No. 13/959,454, filed on Aug. 5, 2013, now U.S. Pat. No. 10,122,656, issued on Nov. 6, 2018, which are incorporated herein by reference in their entireties.

BACKGROUND

Technical Field

The present disclosure generally relates to the field of electronic communications. More specifically, and without limitation, the exemplary embodiments described herein relate to systems and methods for managing electronic communications among enterprises and/or other entities.

Background

Various instant messaging (IM) services have provided users with the ability to communicate electronically in real-time with one another. With the rise of social networking and short message service (SMS) communications, public IM service usage has declined. Enterprise IM usage, however, has increased in recent years. This increase in enterprise IM usage may be attributed, at least in part, to enterprise adoption of unified communication (UC) suites.

Unified communication is the integration of various real-time communication services, such as IM, telephony, video conferencing, and data sharing (e.g., electronic whiteboards), with various non-real-time communication services, such as voicemail, e-mail, SMS, and fax. Among other advantages, UC allows a user to send a communication via one medium (e.g., telephone/voicemail) and have a UC user receive the message via a different medium (e.g., e-mail). For example, an individual may call a UC user and leave that user a voicemail, and the UC software may use a common encoding protocol (e.g., .WAV, .mp3) to save the voicemail as an audio file and send that file to the user via e-mail. The variety of communication mediums integrated in UC suites make them particularly attractive to enterprises and other entities as tools for streamlining enterprise communications.

Enterprises not only use UC suites to facilitate communication among users within the same enterprise, but also use these suites to facilitate communication among users from different enterprises. For example, two enterprises that establish a partnership to achieve a business goal may require a tool for facilitating communications among users working to achieve that goal within each of the enterprises. Accordingly, the enterprises may configure their UC suites to interoperate, such that information pertaining to the common goal of the enterprises may be exchanged more easily between users from the different enterprises.

Current techniques for establishing interoperability between UC suites of different enterprises suffer from several drawbacks. For example, current techniques for enabling inter-enterprise communications require that two enterprises establish an agreement between them (e.g., a "federated agreement"), and each enterprise must manually configure its server to enable communications with the other. Although this may be only a minor hindrance when an enterprise has a small number of business partners, the management of enterprise servers can become quite complex when enterprises wish to federate with multiple other enterprises. Further, current techniques for establishing communications between enterprises make it difficult to determine the array of potential partnerships available to an enterprise or the communication capabilities of each potential partner. Thus, many existing inter-enterprise communication arrangements are based on pre-existing business relationships. Moreover, software and hardware supporting such inter-enterprise communications are manually configured.

The drawbacks of conventional techniques for establishing communications between enterprises hinder the ability of enterprise users to engage in inter-enterprise communications. For example, the difficulty of establishing manual connections between enterprises discourages federated communications between enterprises. Moreover, enterprises are unaware of potential enterprise partners with whom they may communicate because no directory currently exists for identifying enterprises that are willing and able to form federation agreements with other enterprises. Even in a situation where an enterprise may be aware of the existence of potential enterprise partners, the enterprise may be unable to discern the communication architecture and/or capabilities of those potential partners and, thus, unable fully to understand the potential for federated communications between enterprises.

SUMMARY

Consistent with the present disclosure, systems and methods are provided for managing electronic communications. Embodiments consistent with the present disclosure include computer-implemented systems and methods for managing communication partnerships between enterprises and/or other entities, such that users associated with different enterprises may more easily communicate with one another. In addition, systems and methods consistent with the present disclosure may facilitate discovery of potential enterprise partners and facilitate electronic communications between enterprise partners based on the capabilities and wishes of the partners. Embodiments consistent with the present disclosure may overcome one or more of the drawbacks or problems set forth above.

In accordance with one exemplary embodiment, a computerized method is provided for managing electronic communications. According to the method, an enterprise directory is provided that lists a plurality of enterprises. The method also includes defining a partnership between at least two of the listed plurality of enterprises and storing an indication of the defined partnership in a database. The method further includes receiving a request from a source user associated with a first enterprise to communicate electronically over a network with a target user associated with a second enterprise. Moreover, the method includes enabling electronic communications between the source user and the target user.

In accordance with another exemplary embodiment, a system is provided for managing electronic communications. The system includes a database and at least one processor in communication with the database. The processor is configured to perform operations for managing electronic communications, including providing an enterprise directory that lists a plurality of enterprises. The processor is also configured to define a partnership between at least two of the listed plurality of enterprises and store an indication of the defined partnership in the database. Moreover, the processor is configured to receive a request from a source user associated with a first enterprise to communicate electronically over a network with a target user associated with a second enterprise. The processor is further configured to enable electronic communications between the source user and the target user.

In accordance with yet another exemplary embodiment, a computer readable storage medium is provided including a set of instructions for managing electronic communications. When executed, the set of instructions may cause at least one processor to perform steps for providing an enterprise directory that lists a plurality of enterprises. The instructions may further cause the processor to define a partnership between at least two of the listed plurality of enterprises and store an indication of the defined partnership in a database. The steps performed by the processor also include receiving a request from a source user associated with a first enterprise to communicate electronically over a network with a target user associated with a second enterprise. The instructions also cause the processor to enable electronic communications between the source user and the target user.

Before explaining certain embodiments of the present disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception and features upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

The accompanying drawings, which are incorporated in and constitute part of this specification, and together with the description, illustrate and serve to explain the principles of various exemplary embodiments.

DETAILED DESCRIPTION OF EXEMPLARY EMBODIMENTS

Figure 1A:
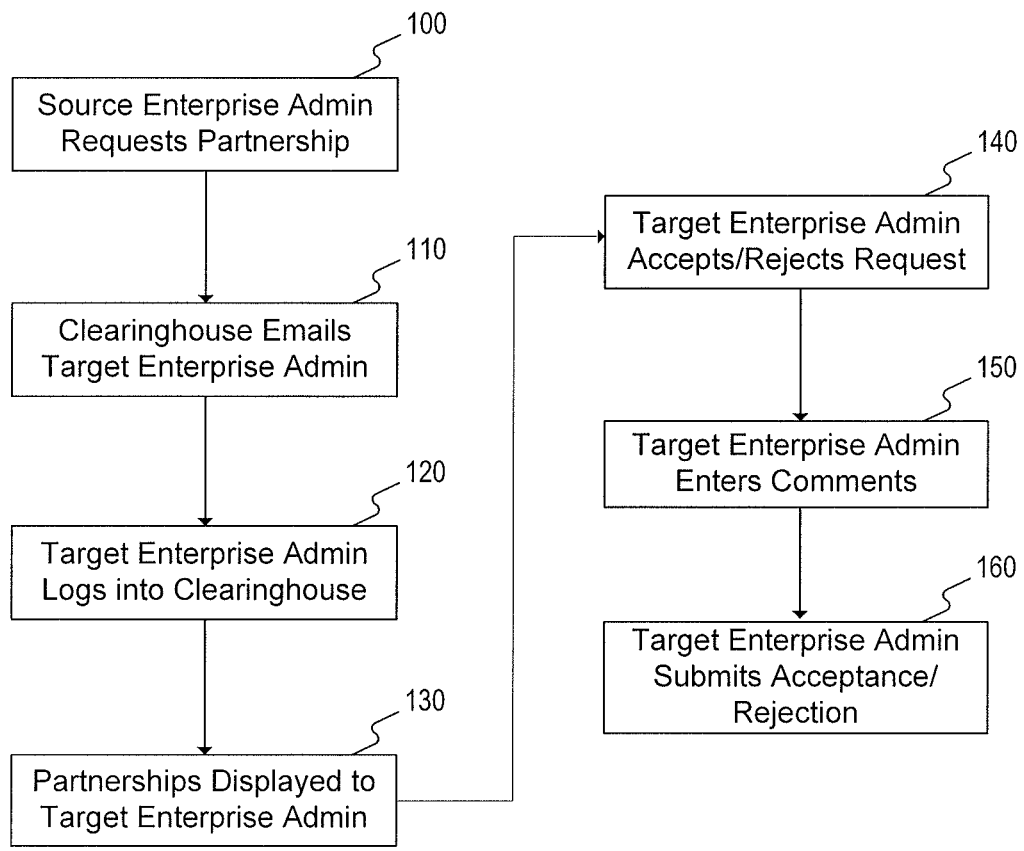
FIGS. 1A and 1B are diagrams depicting exemplary operations or flows for managing partnerships, in accordance with an embodiment of the present disclosure.

Reference will now be made in detail to the exemplary embodiments implemented according to the disclosure, the examples of which are illustrated in the accompanying drawings. Wherever possible, the same reference numbers will be used throughout the drawings to refer to the same or like parts.

Embodiments herein include computer-implemented methods, tangible non-transitory computer-readable mediums, and systems. The computer-implemented methods may be executed, for example, by at least one processor that receives instructions from a non-transitory computer-readable storage medium. Similarly, systems consistent with the present disclosure may include at least one processor and memory, and the memory may be a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Embodiments of the present disclosure provide improved systems and methods for managing electronic communications. The disclosed embodiments enable enterprises and/or other entities running disparate real-time communications and collaboration applications to use a single service to identify, request, and establish electronic communications with other enterprises and/or entities. The enterprises and/or other entities may each have one or more users. Electronic communications may occur over one or more networks, including the Internet, for example.

According to certain embodiments, the service and computerized system that enables enterprises to identify, request, and establish communications with one another may be referred to as a clearinghouse. Among other features and advantages, the disclosed embodiments provide discoverability, connectivity, and simplicity. For example, the disclosed embodiments may relieve enterprises of the burden of having manually to establish and manage point-to-point communications channels for each enterprise partner. Moreover, certain disclosed embodiments provide a comprehensive and convenient method to enable discovery of new enterprise partners, such as through and enterprise directory.

According to certain embodiments, a clearinghouse may be implemented using one or more servers. For example, the clearinghouse may include one or more gateway servers for managing electronic communications, such as by providing enterprise users with access to an enterprise and/or user directory, establishing partnerships between enterprises and/or between enterprise domains, and enabling communications between the enterprise users (e.g., routing and/or translating communications between users). The clearinghouse may also include one or more databases for storing information used by the clearinghouse, such as enterprise/ user profile and/or directory information and information regarding partnerships between enterprises.

In some embodiments, the one or more servers of the clearinghouse may be accessible via a network, such as the Internet. For example, enterprise users may utilize a network, such as the Internet, to access a clearinghouse portal to perform functions associated with the clearinghouse (e.g., update profile information, manage partnerships, communicate with other users). In one embodiment, users may access and perform clearinghouse functions via one or more clearinghouse portal screens or interfaces. For example, a user may enter profile information, manage partnerships, and communicate with other users using an interface, such as one or more web pages hosted by the clearinghouse (e.g., on the one or more gateway servers) and viewed using a web browser at a user terminal. In other embodiments, users may perform clearinghouse functions via email. For example, users may communicate with a global administrator associated with the clearinghouse to manage partnerships with other enterprises. Users may also access and perform functions associated with the clearinghouse (e.g., updating profile information, managing partnerships, and engaging in communications with other users) using a combination of email and interaction with a portal screen/web interface.

According to certain embodiments, an enterprise may use a single connection to connect to public IM users (e.g., users of AOL Instant Messenger (AIM)) affiliated with the clearinghouse, as well as any other enterprise connected to the clearinghouse. The clearinghouse allows enterprises to partner with one another and engage in real-time communications, without manually defining and maintaining a complex networking configuration. In one embodiment, to initiate a partnership, one enterprise sends a partnership request to another partnership. The partnerships may have a pre-existing business relationship, or one partnership may discover the other partnership through an online partnership directory provided by the clearinghouse. Once the receiving enterprise accepts the request, the two enterprises are enabled to electronically communicate with one another.

According to certain embodiments, the clearinghouse may provide enterprises with the ability to engage in real-time communications with one another. In other words, users associated with one enterprise may engage in real-time communications with users associated with another enterprise over a communications network, such as the Internet. Among other forms of communication, such real-time communications may include instant messaging, chat rooms, telephony, video conferencing, and collaboration via an electronic whiteboard. In other embodiments, the clearinghouse may also provide additional services beyond real-time communications services, such as other applications (e.g., non-real-time applications) that facilitate collaboration between enterprises, including e-mail, calendaring, and other applications, including proprietary applications developed for a particular enterprise partnership.

In some embodiments, a user may be associated with an enterprise based on an employment relationship. In other embodiments, a user may be associated with an enterprise based on the user's membership in an organization, such as a non-profit organization, trade organization, civic organization, or any other group of individuals that shares some characteristic or otherwise desires to facilitate communications with one another. According to one embodiment, a user may be associated with an enterprise if the user has a user account associated with a certain web domain. For example, a user may be associated with AOL Corporate if the user has an email address associated with the AOL Corporate web domain (i.e., teamaol.com). In another example, a user may be associated with AOL Inc. if the user has an email address associated with any domain owned by a company affiliated with AOL Inc. (e.g., engadget.com, mapquest.com, huffingtonpost.com).

The disclosed embodiments may enable users and/or enterprises to electronically communicate with one another, regardless of the communications protocol used by their respective communications clients. In one embodiment, the clearinghouse may connect users whose communication clients operate on Session Initiation Protocol (SIP), Extensible Messaging and Presence Protocol (XMPP), and/or Open System for Communication in Realtime (OSCAR) protocol (an instant messaging and presence information protocol developed and implemented by AOL Inc. for use with AOL Instant Messenger (AIM)). For example, users associated with an enterprise that utilizes an SIP communications client may communicate with users of an enterprise that utilizes an XMPP client. Alternatively, users of an enterprise that use an SIP or XMPP client may communicate with public IM users of AOL Instant Messenger communicating via the OSCAR protocol. In addition to SIP, XMPP, and OSCAR, the clearinghouse may also connect users whose communication clients operate on other networking protocols, as will be appreciated from this disclosure and the exemplary embodiments disclosed herein.

Several components may be provided to facilitate establishment of enterprise partnerships, in accordance with certain embodiments. Each enterprise belonging to the clearinghouse may be represented by an enterprise profile. An enterprise profile may be created by an enterprise administrator for display in the clearinghouse's enterprise directory. In one embodiment, the enterprise directory lists all enterprise members of the clearinghouse. This directory may provide a starting point for enterprises to create partnerships. A user profile may also be provided for each user associated with a member enterprise, such that each enterprise user may include information (e.g., hobbies, interests, demographic and geographic information) that may enable other enterprise users to determine whether to form a communications partnership with the enterprise to which the user belongs.

In addition to company profiles, user profiles, and a directory of enterprise users, other components of the clearinghouse may include partnership management, gateway controls, and registration. With respect to partnership management, certain disclosed embodiments provide the ability of enterprise administrators to manage partnerships with other enterprises and/or other enterprise domains. For example, administrators may be provided with the ability to request partnerships, accept or deny partnership requests, and view existing and pending (i.e., requested) partnerships. Gateway controls may be provided to enforce partnership restrictions. In other words, gateway controls may determine whether communications may flow between two enterprises or enterprise domains based on whether the two enterprises or enterprise domains have an established communications partnership. Registration may provide enterprise administrators, as well as other potential users of the clearinghouse, with access to the clearinghouse.

As discussed above, each enterprise member of the clearinghouse may be identified and described by an enterprise profile. This profile may define the set of information that other members of the clearinghouse will see in the enterprise directory. In one embodiment, information included in a company profile may be shared in accordance with three levels of accessibility: public, full, and internal. Information that is designated publicly accessible may be viewable to all clearinghouse members, including all enterprise partners and non-partners, as well as to clearinghouse administrators (i.e., administrators overseeing operation of the entire clearinghouse). Information that is designated fully accessible may be viewable to enterprise partners and clearinghouse administrators, but not viewable to non-partner enterprises. Internal information may be restricted to users associated with the enterprise represented by the profile and clearinghouse administrators. In one embodiment, an entire enterprise profile may be designated as having one level of accessibility (i.e., the entire profile is publicly accessible). In an alternative embodiment, certain elements of an enterprise profile (e.g., a listing of projects in development) may be configured to have one level of accessibility (e.g., internal) and others (e.g., enterprise name, ticker symbol) may be configured to have another level of accessibility (e.g., public).

In accordance with certain embodiments, public enterprise profile information may be displayed when clearinghouse members browse the enterprise directory (e.g., to identify potential enterprise partners). Among other data elements, a public enterprise profile may include an enterprise name, industry, standard industrial classification (SIC) code, stock/ticker symbol, enterprise URL, enterprise description, and enterprise logo. A full profile may be displayed to the enterprise partners. In one embodiment, the full profile includes all of the information included in a public enterprise profile, as well as business and technical contact information, such as business contact name, phone, and email, and technical contact name, phone, and email. An internal profile may be visible to members of an enterprise and clearinghouse administrators only. An internal profile may contain all public and full enterprise profile information, as well as any other information necessary for clearinghouse support. In addition to technical information intended for use by clearinghouse administrators, an internal enterprise profile may also include enterprise confidential information for display to users associated with the enterprise.

An enterprise directory may be provided comprising the enterprise profiles of each enterprise that participates in the clearinghouse. In one embodiment, the enterprise directory may be available to all users with access to the clearinghouse. The enterprise directory may also be searchable. For example, certain fields of an enterprise profile may be indexed, such that users may search for enterprises based on those fields. In one embodiment, searchable fields may include enterprise name, industry, and stock/ticker symbol. In alternative embodiments, other fields of an enterprise profile, such as the exemplary fields of a public enterprise profile listed above, may also be searchable. Enterprises that participate in the clearinghouse but which have not yet created an enterprise profile may appear greyed out (or otherwise indicated) in the enterprise directory.

In accordance with certain embodiments, an enterprise profile may be modified by an enterprise administrator, but may not be deleted. In other words, once created by an enterprise administrator, an enterprise profile will persist, unless deleted by a clearinghouse administrator. An enterprise administrator may opt out of the clearinghouse altogether. In accordance with an alternative embodiment, an enterprise administrator may delete an enterprise profile, such as when the enterprise leaves (i.e., disassociates) with the clearinghouse.

In addition to enterprise profiles and an enterprise directory, user profiles and a user directory may also be provided, in accordance with certain embodiments. An enterprise user may access the clearinghouse based on an association with an enterprise that participates in the clearinghouse. An enterprise user may be categorized into one or more roles, which may limit or enable access by the user to various components of the clearinghouse. A global administrator may access any feature for any user in the clearinghouse. A global administrator may create enterprise or user profiles, modify enterprise or user profiles, create/modify/delete partnerships among users and enterprises, force a "forgot password" workflow for a user, browse the enterprise directory, and browse the user directory. A clearinghouse operations user may be provided with the ability to create and modify enterprise and user profiles, but should not have all rights bestowed upon a global administrator. The global administrator and clearinghouse operations roles are restricted to a small number of users associated with the overall administration of the clearinghouse.

A clearinghouse administrator may be a user who is responsible for activities of a particular enterprise or enterprise domain on the clearinghouse. A clearinghouse administrator may be provided with the ability to access the identities of other clearinghouse administrators, create other clearinghouse administrator accounts to be associated with the same enterprise or enterprise domain, and designate the access rights held by other clearinghouse administrators associated with the same enterprise or enterprise domain. A clearinghouse user manager associated with an enterprise or domain may manage aspects of the user directory pertaining to users associated with that enterprise or domain. This user manager may add new users individual or in bulk, search the user directory, and modify user data (e.g., user profiles) for individual users associated with the enterprise or domain via either individually (e.g., through a graphical user interface) or in bulk (e.g., using bulk files). A clearinghouse profile manager may manage the enterprise profile associated with a particular enterprise, such as by creating the profile, updating the profile, uploading the enterprise logo, and browsing/searching the enterprise profile directory. A clearinghouse partnership manager may manage the partnership that an enterprise or domain has with one or more other enterprises or domains. The partnership manager may browse/search the enterprise profile directory, initiate a partnership request, delete a partnership, and approve or deny incoming partnership requests from other enterprises or domains. In one embodiment, the above-discussed roles of the clearinghouse administrator, clearinghouse user manager, clearinghouse profile manager, and clearinghouse partnership manager may be combined into one generic clearinghouse administrator role, which may be assigned to one or more users associated with an enterprise or domain.

In addition to clearinghouse- and enterprise-level administrators, other user roles may include application user. The application user role may be limited to reading the user directory. This role may be used by enterprise administrators in developing a user interface for an enterprise to facilitate user searching of the user directory.

In accordance with certain embodiments, a user directory may also be provided to store information pertaining to individual users of the clearinghouse. The user directory may contain a number of fields describing each user. A user ID may provide a unique identifier for the user and may serve as an internal tracking number for use by clearinghouse administrators. A login ID may be used by a user to log into the clearinghouse and may include, among other forms of identification, an email address. A user may also be associated with an enterprise ID, which may be used to associate a user with a particular enterprise.

In addition to the forms of identification above, a user may also be identified by a screen name, such as an AIM screen name, SIP account name or XMPP account name. This screen name may be used to identify the user in instant messaging communications. A user profile may also store a user's common name, given name, and surname. Moreover, the user profile may store a display name (i.e., nickname) representing the name by which a user prefers to be called. The user profile may further store other personal information of a user, such as the user's personal email address, mobile phone number, home residential and/or mailing address, city, state, zip code, and country. A picture, including metadata (e.g., file size, file name, MIME type), may be stored in each user profile. In addition to personal information, the user profile may store work information for a user, such as the user's job title and/or department, enterprise email address, enterprise telephone number, enterprise fax number, and enterprise address (e.g., street address, city, state, zip code, and country). The user profile may also include a comments field, wherein the user may enter any comments that the user wishes—for example, pertaining to personal attributes or work responsibilities. The user profile may also include a LINKEDIN URL, which may represent the location of a user's LINKEDIN profile.

Other information may also be stored in a user profile. This may include account information, such as a status (i.e., active or inactive), password, password change flag (e.g., indicating whether the user is required to change the user password at next login), a date created field (i.e., date the user account was created), a created by field (i.e., user ID of the user who created this user), date modified field (i.e., date the user profile was last modified), and modified by field (e.g., user ID of person who last modified the user profile).

In one embodiment, the user directory may be searchable. For example, an enterprise or enterprise user may search the user directory for users with whom to communicate. In some embodiments, only certain fields within a user profile may be searchable by non-administrator users. For example, the screen name, surname, display name, work email address, personal email address, city, state, and country fields may be searchable, in accordance with one embodiment. In one embodiment, administrator users may search user profiles using any field of data present in a user profile.

Certain embodiments also relate to partnership management. In some embodiments, an enterprise must form a partnership with another enterprise in order for users within the two enterprises to engage in inter-enterprise communications. Accordingly, an enterprise administrator (e.g., a clearinghouse partnership manager) associated with one enterprise may manage partnerships between that enterprise and one or more other enterprises. Moreover, in certain embodiments, partnerships may be managed at a domain level. In these embodiments, domains from the same source enterprise may form partnerships with target enterprises or domains regardless of whether other domains from the source enterprise also form partnerships with the same target enterprises or domains. In other words, a first domain associated with a first enterprise may partner with a second domain associated with a second enterprise, but a third domain associated with the first enterprise need not partner with the second domain associated with the second enterprise.

Figure 1B:
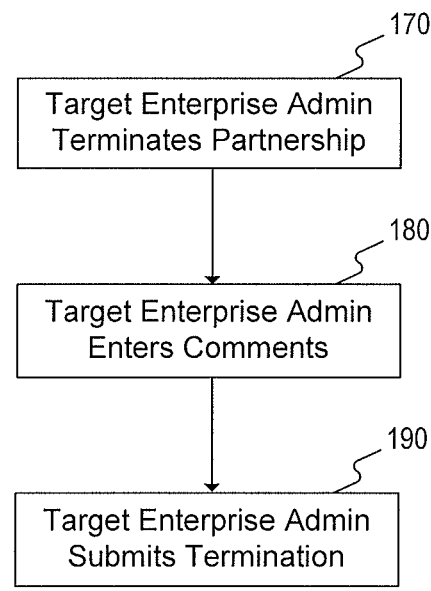
Figure 2:
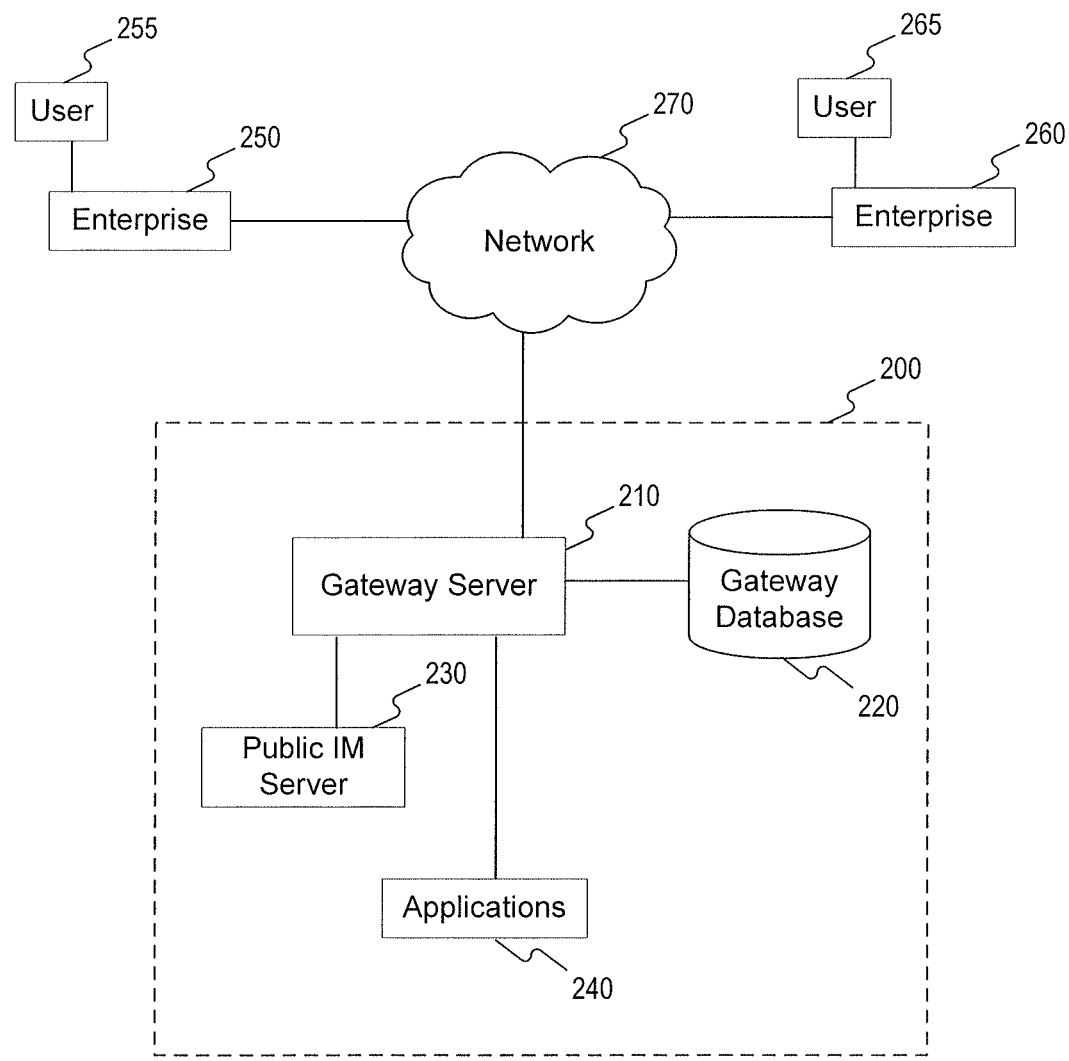
FIG. 2 is a diagram of an exemplary system environment for implementing embodiments consistent with the present disclosure.

FIGS. 1A and 1B are diagrams depicting exemplary operations or flows for managing a partnership, in accordance with an embodiment. The embodiments of FIGS. 1A and 1B may be implemented in a computerized system and network environment, such as that illustrated in FIG. 2. The exemplary embodiment of FIG. 2 is further described below.

As shown in FIG. 1A, in order to initiate creation of a partnership, an enterprise administrator (e.g., clearinghouse partnership manager) may request a target enterprise to form a partnership with a source enterprise associated with the administrator at step 100. For example, in one embodiment, an enterprise administrator may use a client terminal associated with the enterprise to view the enterprise directory (e.g., via a portal screen/web interface) and select, from the directory, an enterprise with which the administrator would like to form a partnership (e.g., by clicking a request button located proximately to the target enterprise name in the portal screen/web interface). In another embodiment, an enterprise administrator may communicate a request to form a partnership with a target enterprise by using a client terminal to send an email with information regarding the requested partnership (e.g., source enterprise name, target enterprise name, comments) to a global administrator or other clearinghouse-level administrator.

In response to the request, at step 110, the clearinghouse (e.g., the global administrator or other clearinghouse-level administrator) may send an email to the administrator (e.g., clearinghouse partnership manager) of the target enterprise to inform that user that the source enterprise wishes to establish a partnership with the target enterprise in the clearinghouse. In one embodiment, the email may contain public profile information for the source enterprise, along with a link (e.g., hyperlinked text or image) that the target enterprise administrator may select to navigate to a clearinghouse portal to respond to the request.

Upon logging into the clearinghouse portal at step 120, the target enterprise administrator may be presented with a page displaying all partnerships for the target enterprise at step 130. The displayed list of partnerships may include current partnerships, as well as pending (i.e., requested) partnerships. The target enterprise administrator may accept or reject a pending partnership at step 140. Moreover, the target enterprise administrator may enter comments to be delivered to the source enterprise administrator along with the acceptance/rejection of the invitation at step 150. At step 160, the target enterprise administrator may submit the acceptance/rejection, which will cause a reply email to be sent to the source enterprise administrator (including any comments) and, if the response was an acceptance, an entry will be created in a clearinghouse database indicating the partnership between the source and target enterprises.

In addition to creating partnerships, an enterprise administrator may also terminate a partnership, thus disabling future communications with a partner enterprise. As shown in FIG. 1B, to terminate a partnership, at step 170, an enterprise administrator may select a partner enterprise whose relationship therewith the administrator wishes to terminate. The enterprise administrator may enter comments explaining the reason for the partnership termination at step 180. For example, in one embodiment, an enterprise administrator may use a client terminal associated with the enterprise to view a list of active partnerships (e.g., via a portal screen/web interface) and select, from the list, a partnership that the administrator would like to terminate (e.g., by clicking a terminate button located proximately to a partner enterprise name in the portal screen/web interface). The enterprise administrator may also utilize the portal screen or web interface to enter any comments regarding the reasons for terminating the partnership. In another embodiment, an enterprise administrator may communicate a request to terminate a partnership with a partner enterprise by using a client terminal to send an email with information regarding the partnership (e.g., source enterprise name, target enterprise name, comments) to a global administrator or other clearinghouse-level administrator.

At step 190, the enterprise administrator may submit the termination, which will cause an email to be sent to the partner enterprise administrator (including any comments) and remove the indication of the partnership from the clearinghouse database. For example, in one embodiment, a gateway server may generate and send an email notification to a global administrator (or other clearinghouse-level administrator) regarding the request to terminate the partnership. The global administrator may then use a portal screen or web interface to send a notification to the partner enterprise administrator regarding the request to terminate the partnership. Alternately, the global administrator may send an email informing the partner enterprise administrator of the terminated partnership to the partner enterprise administrator directly (i.e., without using the portal screen or web interface to generate the email). In another embodiment, upon receiving the request to terminate a partnership, the gateway server may email the partner enterprise administrator directly (i.e., without emailing the global administrator) regarding the request to terminate the partnership. Moreover, in one embodiment, the gateway server may remove the indication of the partnership from the database automatically upon receiving the request to terminate the partnership from the enterprise administrator. In an alternate embodiment, the indication of the partnership may not be removed from the database until a global administrator has approved the request to terminate the partnership.

According to certain embodiments, the clearinghouse may comprise a gateway that is provided as the central control point for the clearinghouse. The gateway may comprise one or more servers operating to control the flow of communications from and between users of the clearinghouse. The gateway may become aware of partnerships among users and restrict communications between any parties that are not in a partnership with one another. In one embodiment, the gateway may verify that a partnership exists between a source and destination user by identifying the domains to which the source and destination users belong and verifying that a partnership exists between those domains. For example, the gateway may allow a source user to electronically communicate with a target user if the domain to which the source user is assigned has a partnership with the domain to which the target user is assigned. In one embodiment, the gateway may determine that the domains to which the source and target users are assigned have a partnership if those domains are associated with enterprises that have a partnership with one another in the clearinghouse.

In one embodiment, partnership information may be stored in one or more databases in communication with the one or more gateway servers. For example, one or more tables in one or more databases may store information identifying each partnership between enterprises. In addition to the identities of the parties to the partnership, each partnership record in a table may store other information, such as the types of communication permitted between parties to the partnership (e.g., IM, video), the date of partnership formation, the duration or expiration date of the partnership, and any other restrictions or other details concerning the partnership.

If the gateway determines that a partnership exists between the source and destination users (or between their domains/enterprises), the gateway may allow the communication between the users to proceed. If the gateway determines that a partnership does not exist between the source and destination users, the gateway may notify the source user that communications between the source and destination users is not currently possible. In one embodiment, the gateway may suggest to the source user that the source user contact an administrator associated with the source user's enterprise with a request to establish a partnership with the target user's enterprise or domain.

In accordance with certain embodiments, in order to access the clearinghouse, an enterprise must first register with the clearinghouse. In one embodiment, an enterprise that wishes to join the clearinghouse sends a global administrator a request to join the clearinghouse, including an email address of a person associated with the enterprise who will be responsible for the enterprise's presence on the clearinghouse. The global administrator may send an invitation to the responsible party to join the clearinghouse via email. For example, a clearinghouse user interface displayed to global administrators may include a button or link for sending an invitation to join the clearinghouse. Upon clicking the button or link, a dialog may be displayed to the global administrator prompting the administrator to enter the email address of the enterprise administrator to whom the invitation should be sent.

In one embodiment, when the email address of the enterprise administrator is submitted by the global administrator, a request may be sent to a provisioning servlet. The provisioning servlet may generate an invitation key and send an invitation to the user. According to one embodiment, an invitation key may be an encrypted (e.g., AES-encrypted) string comprising an email address, date of issuance, and date of expiration. In this embodiment, each key may have a finite lifespan. Moreover, a default lifespan (e.g., 20 or 30 days) may be provided in the event that a lifespan is not manually defined by the global administrator at the time the invitation is sent. The information in the invitation key may be saved to a clearinghouse database for future use. For example, the email address, issuance date, and expiration date may be saved in a database, such that acceptance of an invitation may be verified against the information from the invitation key. In one embodiment, an invitation key may be removed from the database automatically after its expiration date has passed (e.g., the day immediately following its expiration date).

An email may be sent on behalf of the clearinghouse to the enterprise administrator. The email may describe the clearinghouse (and its associated services) and include a link for the enterprise administrator to click in order to enable the enterprise administrator's account. The date and time the email was sent may be saved into a clearinghouse database, and a flag indicated that the enterprise administrator received the email may also be set in the clearinghouse database. In one embodiment, if the enterprise administrator has not responded to the invitation after the passage of a pre-defined first period of time (e.g., 14 or 21 days), a reminder email will be sent automatically by the clearinghouse to the enterprise administrator. Moreover, the date and time of this email may be saved in the clearinghouse dataset, along with the information regarding the original invitation email sent to the enterprise administrator. According to one embodiment, after a pre-defined second period of time (or after a pre-defined number of reminder emails), the enterprise administrator may be flagged as unresponsive. Upon determining that the enterprise administrator is unresponsive, a global administrator may attempt to contact the enterprise administrator through other means (e.g., telephone) or may attempt to contact another administrator associated with the enterprise, if information on such an administrator has been provided to the clearinghouse.

If an enterprise administrator responds (e.g., by clicking on a link in the invitation email), the response will be verified at the clearinghouse. In one embodiment, a global administrator may access a database to determine whether the email address that sent the response is associated with an invitation key in the database. If so, and if the invitation key has not expired, the global administrator may create a clearinghouse account for the enterprise administrator. A clearinghouse account will initially include only basic information, such as logon credentials (e.g., a user name and password). For example, upon verification of acceptance of an invitation, a clearinghouse account may be created for an enterprise administrator comprising a user name (e.g., email address) and initial password (e.g., Welcome 1).

Account information, such as the logon credentials, may be communicated from the clearinghouse to the enterprise administrator. In one embodiment, an email containing logon credentials may be sent to the enterprise administrator. In an alternate embodiment, one email containing a user name and a separate email containing a password may be sent to the enterprise administrator. In yet another alternate embodiment, logon credentials may be communicated to the enterprise administrator through other means, such as via telephone. The enterprise administrator may use the logon credentials to access the clearinghouse.

Once the enterprise administrator accesses the clearinghouse, the administrator may provide additional information to be stored as part of the administrator's user profile on the clearinghouse. For example, a form may be displayed to the administrator upon login that requests the administrator's name, phone number, and any other user profile field described above. The enterprise administrator may also modify the password associated with the account to enhance account security. After the enterprise administrator completes the user profile, the user profile may be stored in a clearinghouse database (e.g., in a user profile table).

If no enterprise profile has been established for the administrator's enterprise, the administrator may be prompted to complete an enterprise profile. For example, a form may be presented to the enterprise administrator comprising input fields for the enterprise name, address, industry, and any other field of the enterprise profile discussed above. The information entered into this form may be stored in a clearinghouse database (e.g., in an enterprise profile table).

FIG. 2 depicts an exemplary system environment for implementing embodiments of the present disclosure. The number and configuration of elements shown in FIG. 2 are non-limiting and exemplary in nature. Other configurations, combinations, and number of elements may be provided to implement the system environment of FIG. 2.

The exemplary embodiment of FIG. 2 includes a clearinghouse 200. Clearinghouse 200 may include one or more server systems, databases, and/or computing systems configured to manage communications among enterprises. In one embodiment, clearinghouse 200 may include gateway server 210, gateway database 220, public instant messaging (IM) server 230, and applications 240, all of which are illustrated in a region bounded by a dashed line for clearinghouse 200 in FIG. 2.

Further, in one embodiment, clearinghouse 200 may transmit and/or receive data to/from various other entities or components, such as enterprises 250 and 260, enterprise users 255 and 265, and electronic network 270. More specifically, clearinghouse 200 may be configured to store user and enterprise profiles, form partnerships among enterprises, and manage communications between the enterprises and/or users.

The various components of clearinghouse 200 may include an assembly of hardware, software, and/or firmware, including a memory, a central processing unit ("CPU"), and/or a user interface. Memory may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. A CPU may include one or more processors for processing data according to a set of programmable instructions or software stored in the memory. The functions of each processor may be provided by a single dedicated processor or by a plurality of processors. Moreover, processors may include, without limitation, digital signal processor (DSP) hardware, or any other hardware capable of executing software. An optional user interface may include any type or combination of input/output devices, such as a display monitor, keyboard, and/or mouse.

As described above, clearinghouse 200 may be configured to store user and enterprise profiles. For example, information pertaining to an enterprise, such as enterprises 250 or 260, may be entered by an enterprise administrator and transmitted to gateway server 210 for processing. Information pertaining to enterprise users, such as enterprise users 255 and 265, may also be entered by an enterprise administrator or the enterprise users and transmitted by the users or their enterprise administrators to gateway server 210 for processing. The received enterprise and user profiles may be stored by the gateway server 110 at gateway database 220. Gateway database 220 may be any suitable type of large scale data storage device, which may optionally include any type or combination of slave databases, load balancers, dummy servers, firewalls, back-up databases, and/or any other desired database components.

The stored enterprise and user profiles may be made available by gateway server 210 to enterprises users via one or more directories, such as a user directory and enterprise directory. Enterprises may use these directories to form partnerships with one another. For example, enterprise 250 may discover enterprise 260 by searching the enterprise directory for enterprises in the same industry as enterprise 250. Enterprise 250 may communicate a request to form a partnership with enterprise 260 to enterprise 260 through gateway server 210. If enterprise 260 accepts the request, gateway server 210 may store an indication of the partnership between enterprises 250 and 260 in gateway database 220.

In addition to storing profiles and partnership information, clearinghouse 200 may also manage communications among enterprises based on the partnerships among the enterprises. For example, enterprise user 255 may attempt to establish electronic communication with enterprise user 265 via gateway server 210. Gateway server 210 may check gateway database 220 to verify that a partnership exists between enterprises 250 and 260. If a partnership exists between enterprises 250 and 260, the gateway server 210 will facilitate communication between enterprise users 255 and 265. If no partnership exists between enterprises 250 and 260, then gateway server 210 will inform enterprise user 255 that communications between enterprise users 255 and 265 are not currently possible via gateway server 210.

In order to facilitate electronic communication among enterprises, gateway server 210 may translate electronic communications, such that they may be understood by their intended recipients. Thus, gateway server 210 may enable enterprises that communicate using different protocols to exchange messages with one another without having to translate those messages at the client or enterprise side. For example, users associated with enterprise 250 may electronically communicate using SIP, whereas users associated with enterprise 260 may electronically communicate using XMPP. Moreover, users may communicate with one another over AIM using OSCAR. Gateway server 220 may translate communications between enterprise users 255 and 265, regardless of the particular communication protocols utilized by enterprises 250 and 260.

Enterprise users may communicate through gateway server 210 using various modes of electronic communication, such as instant messaging, voice, chat, email, and electronic whiteboard (not shown). The types of communication in which a particular pair of entities may engage may be defined as part of their partnership agreement and stored by gateway server 210 in gateway database 220. In addition, clearinghouse 200 may also provide one or more applications 240 to facilitate electronic communications between enterprise users. Applications 240 may include both internally developed applications and third-party applications hosted by gateway server 210.

Gateway server 210 may also be connected to one or more electronic network(s) 270. In one embodiment, electronic network 270 comprises the Internet. Further, electronic network 270 may comprise any combination of wired and wireless networks. Examples of electronic networks that may be used to implement network 270 include a local area network (LAN), a wireless LAN, e.g., a "WiFi" network, a wireless Metropolitan Area Network (MAN) that connects multiple wireless LANs, a wide area network (WAN), e.g., the Internet, and a dial-up connection (e.g., using a V.90 protocol or a V.92 protocol). Further, the Internet may include any publicly accessible network or networks interconnected via one or more communication protocols, including, but not limited to, hypertext transfer protocol (HTTP) and transmission control protocol/internet protocol (TCP/IP). Moreover, network 270 may also include one or more mobile device networks, such as a GSM network or a PCS network, that allow user devices to send and receive data via applicable communication protocols, including those described above.

In accordance with certain embodiments, gateway server 210 may publish one or more user or enterprise profiles to the general public over electronic network 270. In other embodiments, user and enterprise profiles are made available only to users who have registered with gateway server 210. Gateway server 210 may also utilize electronic network 270 to enable prospective enterprises and prospective public users of clearinghouse 200 to connect to clearinghouse 200, for example, to register to use one or more services provided by clearinghouse 200. In addition, gateway server 210 may utilize the connection to electronic network 270 to connect enterprise and public users of clearinghouse 200 to enterprise and public users associated with other servers or systems, such as users of other public IM servers.

It will be appreciated that any suitable configuration of software, processors, and data storage devices may be selected to carry out the embodiments of clearinghouse 200. The software and hardware associated with clearinghouse 200 may be selected to enable quick response to various business needs, relatively fast prototyping, and delivery of high-quality solutions and results. An emphasis may be placed on achieving high performance through scaling on a distributed architecture. The selected software and hardware may be flexible, to allow for quick reconfiguration, repurposing, and prototyping for research purposes. The data flows and processes described herein are merely exemplary, and may be reconfigured, merged, compartmentalized, and combined as desired. The exemplary modular architecture described herein may be desirable for performing data intensive analysis. A modular architecture may also be desired to enable efficient integration with external platforms, such as content analysis systems, various plug-ins and services, etc. Finally, the exemplary hardware and modular architecture may be provided with various system monitoring, reporting, and troubleshooting tools.

Figure 3:
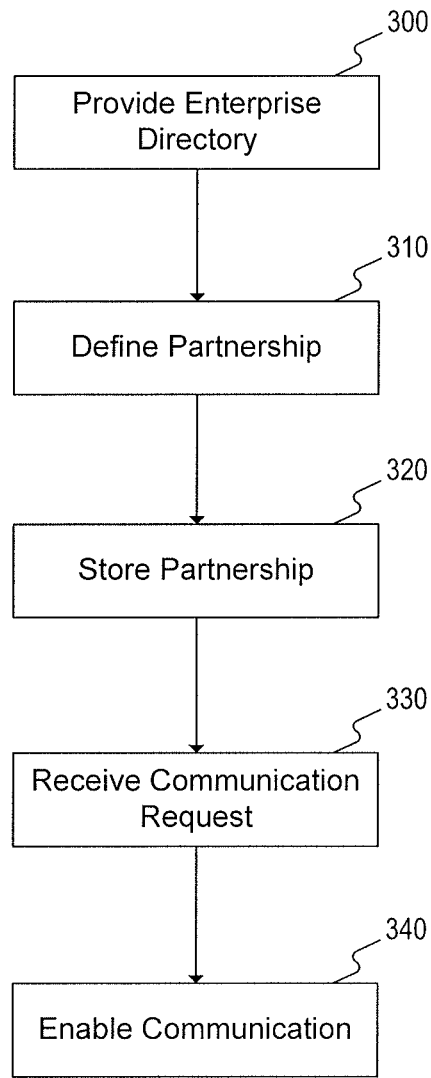
FIG. 3 illustrates an exemplary process for managing electronic communications, in accordance with an embodiment of the present disclosure.

FIG. 3 depicts an exemplary process for managing electronic communications, in accordance with an embodiment of the present disclosure. The steps associated with this exemplary process may be performed by the components of FIG. 2. In the following description, reference is made to certain components of FIG. 2 for purposes of illustration. It will be appreciated, however, that other implementations are possible and that components other than that illustrated in FIG. 2 may be utilized to implement the exemplary method of FIG. 3.

In step 300, an enterprise directory is provided that lists a plurality of enterprises. In one embodiment, the enterprise directory may also provide an enterprise profile for each enterprise listed in the directory. Each enterprise profile may include information describing the enterprise, such as the enterprise name and address, as well the modes of communication (e.g., instant messaging, voice, email) used by the enterprise for internal and external enterprise communication. According to certain embodiments, the enterprise profiles may be created, accessed, modified, and deleted using the gateway server 210. Moreover, the enterprise profiles and the enterprise directory may be stored in gateway database 220.

Enterprises may form partnerships with one another, such that users who are associated with different enterprises may communicate with one another. In one embodiment, a source enterprise may send a request to form a partnership with a target enterprise to the gateway server 210. The gateway server 210 may send a notification of the partnership request, such as by email, to the target enterprise. The target enterprise may respond by communicating an acceptance or rejection of the partnership request to gateway server 210. The gateway server 210 may define a partnership between the two enterprises in step 310 and store an indication of the defined partnership in gateway database 220 in step 320.

At step 330, gateway server 210 may receive a request from a source user associated with a first enterprise to communicate with a target user associated with a second enterprise. Gateway server 210 may enable communication between the source user and the target user at step 340. In certain embodiments, enabling communication between the source user and the target user may include both translating and routing electronic communications sent between the source and target users. For example, gateway server 210 may translate communications sent according to XMPP into SIP communications and route those communications between the source and target users. In other embodiments, enabling communication between the source user and the target user may include routing electronic communications sent between the source and target users, without translating the communications. For example, gateway server 210 may not need to translate communications between two users whose enterprises or domains communicate using the same communications protocol (e.g., the enterprises or domains of both users communicate using SIP). In one embodiment, prior to enabling communication between the source and target users, gateway server 210 first verifies that the first and second enterprises are in a partnership with one another by checking a list of partnerships stored in database 220. In this embodiment, gateway server 210 enables electronic communication between the source and target users only if the first and second enterprises are in a partnership with one another.

In some embodiments, a user directory is also provided listing enterprise users. Enterprise users may communicate with one another using gateway server 210 and/or a public instant messaging server, such as public IM server 230. In one embodiment, gateway server 210 may translate communications sent between the enterprise users. For example, gateway server 210 may translate electronic communications sent by enterprise users (e.g., using XMPP or SIP) into a protocol that may be understood by a client typically operated in a public space (e.g., OSCAR).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, advantageous results still could be achieved if steps of the disclosed techniques were performed in a different order and/or if components in the disclosed systems were combined in a different manner and/or replaced or supplemented by other components. Other implementations are also within the scope of the following exemplary claims.

Therefore, it is intended that the disclosed embodiments and examples be considered as exemplary only, with a true scope of the present disclosure being indicated by the following claims and their equivalents.

What is claimed is:

1. A computer-implemented method for managing electronic communications, the method comprising:
    receiving, at a gateway server, a partnership request from a source enterprise, the partnership request identifying a target enterprise as a potential partner, the source enterprise associated with a first domain and the target enterprise associated with a second domain, the gateway server associated with a clearinghouse, the gateway server configured to facilitate communication between the source enterprise and the target enterprise;
    receiving a response from the target enterprise, the response specifying whether the target enterprise accepts the received partnership request and at least one approved mode of communication in which a source user associated with the source enterprise and a target user associated with the target enterprise can use to communicate;
    receiving a request from the source user having a first mode of communication to electronically communicate with the target user having a second mode of communication; and
    enabling electronic communications between the source user and the target user.

2. The computer-implemented method of claim 1, wherein the first communication protocol and the second communication protocol are selected from a group consisting of extensible messaging and presence protocol (XMPP), session initiation protocol (SIP), and open system for communication in realtime (OSCAR) protocol.

3. The computer-implemented method of claim 1, wherein the gateway server is configured to identify the first domain and the second domain to verify a partnership between the source enterprise and the target enterprise, and wherein an indication of the verified partnership is stored in a database.

4. The computer-implemented method of claim 1, wherein the first mode of communication is at least one of instant messaging and voice.

5. The computer-implemented method of claim 1, wherein a first communications protocol used by the source user and a second communications protocol used by the target user are different communications protocols.

6. The computer-implemented method of claim 1, further comprising:
    providing a user directory, wherein the user directory lists a plurality of enterprise users; and
    enabling electronic communications between the at least two of the plurality of enterprise users.

7. The computer-implemented method of claim 6, wherein enabling electronic communications between the source user and the target user includes translating communications between open system for communication in realtime (OSCAR) protocol and at least one of extensible messaging and presence protocol (XMPP) and session initiation protocol (SIP).

8. A system for managing communications among enterprises through a clearinghouse, the system comprising:
    a database; and
    a gateway server comprising at least one processor in communication with the database and configured to:
    receive, at the gateway server, a partnership request from a source enterprise, the partnership request identifying a target enterprise as a potential partner, the source enterprise associated with a first domain and the target enterprise associated with a second domain, the gateway server associated with a clearinghouse, the gateway server configured to facilitate communication between the source enterprise and the target enterprise;
    receive a response from the target enterprise, the response specifying whether the target enterprise accepts the received partnership request and at least one approved mode of communication in which a source user associated with the source enterprise and a target user associated with the target enterprise can use to communicate;
    receive a request from the source user having a first mode of communication to electronically communicate with the target user having a second mode of communication; and
    enable electronic communications between the source user and the target user.

9. The system of claim 8, wherein the gateway server is configured to identify the first domain and the second domain to verify a partnership between the source enterprise and the target enterprise, and wherein an indication of the verified partnership is stored in the database.

10. The system of claim 8, wherein the at least one processor is further adapted to:
    provide a user directory, wherein the user directory lists a plurality of enterprise users; and
    enable communications between the at least two of the plurality of enterprise users.

11. The system of claim 8, wherein enabling electronic communications between the at least two enterprise users comprises translating communications between open system for communication in realtime (OSCAR) protocol and at least one of extensible messaging and presence protocol (XMPP) and session initiation protocol (SIP).

12. The system of claim 8, wherein enabling electronic communications between the source user and the target user comprises enabling at least one of instant messaging and voice communications between the source user and the target user.

13. A non-transitory computer-readable storage medium that comprises a set of instructions that are executable by at least one processor to cause the at least one processor to perform a method for managing electronic communications, the method comprising:

receiving, at a gateway server, a partnership request from a source enterprise, the partnership request identifying a target enterprise as a potential partner, the source enterprise associated with a first domain and the target enterprise associated with a second domain, the gateway server associated with a clearinghouse, the gateway server configured to facilitate communication between the source enterprise and the target enterprise;

receiving a response from the target enterprise, the response specifying whether the target enterprise accepts the received partnership request and at least one approved mode of communication in which a source user associated with the source enterprise and a target user associated with the target enterprise can use to communicate;

receiving a request from the source user having a first mode of communication to electronically communicate with the target user having a second mode of communication; and enabling electronic communications between the source user and the target user.

14. The non-transitory computer-readable storage medium of claim 13, wherein the gateway server is configured to identify the first domain and the second domain to verify a partnership between the source enterprise and the target enterprise, and wherein an indication of the verified partnership is stored in a database.

15. The non-transitory computer-readable storage medium of claim 13, wherein enabling electronic communications between the source user and the target user comprises enabling at least one of instant messaging and voice communications between the source user and the target user.

16. The non-transitory computer-readable storage medium of claim 13, wherein the at least one processor is further adapted to perform the following operations:

providing a user directory, wherein the user directory lists a plurality of enterprise users; and enabling communications between the at least two of the plurality of enterprise users.

17. The computer-readable storage medium of claim 16, wherein enabling electronic communications between the at least two enterprise users comprises translating communications between open system for communication in realtime (OSCAR) protocol and at least one of extensible messaging and presence protocol (XMPP) and session initiation protocol (SIP).

* * * * *